United States Patent
Sandberg et al.

(10) Patent No.: US 10,177,865 B2
(45) Date of Patent: Jan. 8, 2019

(54) RADIO NETWORK NODE AND METHOD PERFORMED THEREIN

(71) Applicant: TELEFONAKTIEBOLAGET LM ERICSSON (PUBL), Stockholm (SE)

(72) Inventors: David Sandberg, Solna (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/553,063

(22) PCT Filed: Feb. 24, 2015

(86) PCT No.: PCT/SE2015/050206
§ 371 (c)(1),
(2) Date: Aug. 23, 2017

(87) PCT Pub. No.: WO2016/137365
PCT Pub. Date: Sep. 1, 2016

(65) Prior Publication Data
US 2018/0034570 A1    Feb. 1, 2018

(51) Int. Cl.
*H04B 17/373*    (2015.01)
*H04B 17/391*    (2015.01)
*H04L 1/00*    (2006.01)
*H04L 25/02*    (2006.01)

(52) U.S. Cl.
CPC ...... *H04B 17/3913* (2015.01); *H04L 1/0021* (2013.01); *H04L 25/024* (2013.01)

(58) Field of Classification Search
CPC .................................................. H04B 17/373
See application file for complete search history.

(56) References Cited

U.S. PATENT DOCUMENTS 5,715,318 A * 2/1998 Hill ........................... H04S 7/30
381/17
2007/0254602 A1  11/2007 Li et al.

OTHER PUBLICATIONS

Duel-Hallen "Fading Channel Prediction for Mobile Radio Adaptive Transmission Systems" (Year: 2007).*
Duel-Hallen, et al., Fading Channel Prediction for Mobile Radio Adaptive Transmission Systems, Proceedings of the IEEE, vol. 95, No. 12, pp. 2299-2313, Dec. 2007.
Sahlin, Channel Prediction for Link Adaptation in LTE Uplink, Vehicular Technology Conference (VTH Fall), Sep. 3, 2012.

* cited by examiner

*Primary Examiner* — Ayanah S George

(57) ABSTRACT

A method performed by radio network node for enabling channel handling of a channel between a wireless device and the radio network node in a wireless communication network. The channel is defined in continuous time and a sampling rate of the channel is non-uniform. The radio network node predicts a channel gain using a first sampling descriptor indicating a first momentary sampling frequency and a second sampling descriptor indicating a second momentary sampling frequency, wherein the first sampling descriptor operates on a different segment of continuous time than the second sampling descriptor. The predicted channel gain enables channel handling such as channel estimation and link adaptation.

20 Claims, 12 Drawing Sheets

RADIO NETWORK NODE AND METHOD PERFORMED THEREIN

This application is a 371 of International Application No. PCT/SE2015/050206, filed Feb. 24, 2015, the disclosure of which is fully incorporated herein by reference.

TECHNICAL FIELD

Embodiments herein relate to a radio network node and a method performed therein. In particular embodiments herein relate to enabling channel handling in a wireless communication network.

BACKGROUND

In a typical wireless communication network, wireless devices, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB" (eNB). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. The base stations communicate over the air interface operating on radio frequencies with the wireless devices within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, referred to as eNodeBs (eNB) in LTE, and the core network. As such, the RAN of an EPS has an essentially "flat" architecture comprising radio base stations without reporting to RNCs.

Cellular communication networks evolve towards higher data rates, together with improved capacity and coverage. In the 3rd Generation Partnership Project (3GPP) standardization body technologies like GSM, HSPA and LTE have been and are currently developed.

LTE is the latest technology standardized. It uses an access technology based on Orthogonal Frequency Division Multiplexing (OFDM) for the downlink (DL) and Single Carrier Frequency Division Multiple Access (SC-FDMA) for the uplink (UL). The resource allocation to wireless devices on both DL and UL is performed adaptively by the concept of fast scheduling, taking into account the instantaneous traffic pattern and radio propagation characteristics of each wireless device. Assigning resources in both DL and UL is performed in the scheduler situated in the eNB.

In LTE all packets are delivered using the Internet Protocol (IP) protocol. This means that also traditionally circuit switched services such as voice conversation will make use of fast scheduling and is called Voice over IP (VoIP). In a typical VoIP arrangement a voice encoder on a transmitter side encodes the speech into packets. When the transmitter is in Silence Insertion Descriptor (SID) state the encoder will generate packets once every 160 ms (6.25 Hz) and in TALK state packets will be generated once every 20 ms (50 Hz). Voice over LTE (VoLTE) enables LTE networks to provide voice services. To improve battery performance VoLTE wireless devices are configured to use Discontinuous Reception (DRX) where the wireless device only need to wake up to listen for scheduling decisions with a periodicity of e.g. 40 ms (25 Hz).

Additionally, in some situations, when a channel quality is less than perfect, a scheduler will perform segmentation and Hybrid Automatic Repeat Request (HARQ) retransmissions. Segmentation is used when the VoLTE packet cannot be transmitted in one subframe, which could be due to e.g. high pathloss or interference. A packet is then segmented into two or more segments which are transmitted in subsequent Transmission Time Intervals (TTIs), i.e. with a periodicity of 1 ms (1000 Hz). HARQ retransmissions are used when packets are decoded incorrectly. In the LTE uplink, synchronous HARQ is used. Hence the time between initial transmission and retransmission will be 8 ms (125 Hz), which is the normal HARQ Round-Trip Time (RTT).

Link adaptation is performed for matching of the modulation, coding and other signals and protocol parameters to the conditions on a channel, also referred to as a radio channel. In order to perform link adaptation in support of the transmission of VoLTE traffic in the uplink, it is necessary to have access to channel estimates. Such estimates are tied to the transmission of the VoLTE packets and are available when a VoLTE packet is sent in the uplink. This means that when a scheduling decision is to be made for the next transmission, the channel estimate is subject to a delay, i.e. the channel may have changed since the last measurement was made. The measurement rates are summarized in the table I below.

TABLE I

Measurement rates of different states

| State | Measurement rate |
| --- | --- |
| Silence Insertion Descriptor (SID) | 6.25 Hz |

TABLE I-continued

Measurement rates of different states

| State | Measurement rate |
| --- | --- |
| TALK, no bundling of packets | 50 Hz |
| TALK, bundling of 2 packets | 25 Hz |
| Occasional retransmission | 125 Hz |
| Occasional segmentation | 1000 Hz |

VoLTE Scheduling and Link Adaptation

FIG. 1 shows a schematic picture describing the measurement reception and scheduling phases of a typical VoLTE scheduling and link adaptation method Channel measurement reception is performed in the following way.

Action 1. An uplink transmission is received by the eNodeB.

Action 2. This enables the eNodeB to estimate the received channel power at the eNodeB and normalize it with the transmit power of the wireless device. A channel gain can be estimated with a resolution of one channel matrix per Physical Resource Block (PRB) or better, but due to the relatively little data in a VoLTE packet, VoLTE transmissions tend to be narrow band and it is usually enough to use an average over the whole allocation for link adaptation.

Action 3. The channel gain samples are then filtered to smooth out measurement noise. One filter state per wireless device is maintained and used when the wireless device is scheduled.

Uplink scheduling is shown on the right side of FIG. 1.

This section describes the scheduling method for a single wireless device. Inputs are a buffer size of the wireless device, channel gain and interference. The output is the selected Transport Block Size (TBS), modulation and coding scheme (MCS), and an allocation size for the scheduled UE.

Action 11. The channel gain for the wireless device, updated in step 3 above, is fetched from the channel gain filter.

Action 12. The allocation size parameter is initialized to 1 PRB.

Action 13. The transmit power is estimated. The Transmit Power Spectral Density (PSDtx) for the given allocation size is calculated. This is done based on a latest power headroom report, channel gain and allocation size.

Action 14. A Signal to Interference plus Noise Ratio (SINR) is calculated as based on the PSDtx, channel gain and noise and interference according to SINR=PSDtx+gain−interference where all quantities are given in dB and the interference is measured by the eNodeB.

Action 15. The transport block size (TBS) and modulation and coding scheme (MCS) are calculated from the SINR based on a table lookup. This table is designed to give the TBS that gives 10% Block Error Rate (BLER) for a given SINR.

Action 16. If the TBS is larger or equal to the packet size, i.e. the estimated amount of data in the buffer of the wireless device, the TBS, MCS and allocation size is stored and the loop is done. If not, the allocation size is increased and another iteration in the loop is started at action 13.

The Doppler Spectrum

This disclosure concerns prediction of a correlated signal e.g. a signal representing the uplink VoLTE signal. To understand the problem a review of the fading properties of the LTE channel is needed. There are two effects that need to be understood, these are the fading due to delay spread and the fading due to the Doppler effect. As examples are focused on LTE uplink, it is assumed here that the transmitter is located in the wireless device and the receiver in the base station, i.e. the eNB. However, the transmitter and the receiver may e.g. be located in a respective wireless device communicating with one another.

The delay spread is a parameter related to the Power Delay Profile (PDP) of the signal energy seen by the receiver. When a radio pulse or signal is transmitted from a transmit antenna of the transmitter, the radio signal travels to the receiver along different paths, where it experiences different reflections and different scattering for each path. Each path is hence associated with a different distance from the transmitter to the receiver. Since the speed of light is constant, the signal energy arrives at different times in the receiver, although it is sent out at one single point in time. The result is so called delay spread, depicted in FIG. 2. FIG. 2 shows a power delay profile of a radio signal.

Normally this multipath effect is modelled by a finite impulse response filter discretized on the delay. Since the delay spread may be of the order if 1 micro second, the corresponding frequency variation is in the MHz region. When expressed in the frequency domain, such fading is denoted frequency selective fading.

Now the wireless device is sometimes moving. This means that the radio waves transmitted from the wireless device appear compressed in the receiver of the eNB when the wireless device moves towards the receiver, and decompressed when the wireless device moves in the opposite direction i.e. from the receiver. This Doppler effect hence results in a frequency shift with a size roughly equal to the distance traveled per second divided by the wavelength of the carrier frequency, i.e. by $$f_D = \frac{v \Delta t / \lambda}{\Delta t} = \frac{v}{\lambda} = \frac{v}{c} f_c \qquad \text{(eq. 1)}$$

where $f_D$ is the Doppler frequency, v the wireless device speed, c the speed of light, $\lambda$ is the wavelength, and $f_c$ is the carrier frequency.

For 700 MHz and a UE speed of 3 kmph, the Doppler frequency is therefore about 2 Hz. It is hence a much slower process than the frequency selective fading process. Embodiments herein relate to prediction of the power variations due to the Doppler effect, The LTE uplink channel is represented on a time/frequency grid. That grid is normally 20 MHz wide, while the time resolution is 1 ms. For that reason frequency selective fading appears as a power variation, for fixed time over the 20 MHz frequency range, while the Doppler fading is seen as a slow variation over time. The LTE uplink channel, subject to both fading effects appears in FIG. 3.

To be able to predict the power variations of such a channel in the best way, a model of the channel is needed. Some further discussion of the representation of Doppler fading is therefore needed.

It is the case that the energy components that build up the PDP of FIG. 3 travel different distances, they therefore also arrive at the receiver from different directions. As a result, the wireless device movement will not be represented by a single Doppler frequency but rather a distribution of frequencies. Several models have been developed in the communications literature, based on different assumptions on the angle of arrival distribution. Common to most of these modes is that the Doppler power spectrum can be represented by a linear filter, with a bandwidth roughly equal to the Doppler frequency of (eq. 1). The filter is hence of a lowpass type. Further, since the models are statistical ones, and since the filter represents a power spectrum, it follows from standard statistical theory for stochastic processes that the Doppler spectrum can be represented by a linear filter, with a white noise input, i.e. as $$s_D(t) = H(q^{-1})e(t) \quad \text{(eq. 2)}$$

where $q^{-1}$ denotes a delay operator, i.e. $q^{-1}e(t)=e(t-T)$ where T is the sampling period. $s_D(t)$ is the Doppler spectrum output and e(t) is noise.

Optimal Prediction

To predict the value of the linear filter or model of (eq. 2) ahead in time it is suitable to exploit the theory of optimal prediction. Two main approaches exist, based either on the linear filter of (eq. 2) or by a state space representation of it. The two methods give identical results, but exploit slightly different embodiments. The first method based on the linear filter will be discussed in detail, with the second state space based method being commented on briefly. However, it is obvious for anyone skilled in the art that the principles and techniques disclosed in embodiments herein are applicable to any of the methods, hence the validity of the application should cover also these methods.

The linear filter or model of (eq. 2) allows prediction schemes to be developed. In order to obtain a linear optimal predictor the linear filter or model of (eq. 2) is first specified to be an all-pole model of the form:

$$s_D(t) = \frac{1}{A(q^{-1})}e(t) \quad \text{(eq. 3)}$$

$$A(q^{-1}) = 1 + a_1 q^{-1} + \ldots + a_n q^{-n} \quad \text{(eq. 4)}$$

Multiplication from the right with $A(q^{-1})$ then leads to the equation $$s_D(t) = a_1 s_D(t-T) + \ldots + a_n s_D(t-nT) + e(t) \quad \text{(eq. 5)}$$

Now consider prediction of $s_D(t)$ given measurements up to time t−T. Since the optimal prediction of a white zero mean noise sample equals 0, it follows that the optimal predictor is $$\hat{s}_D(t) = a_1 s_D(t-T) + \ldots + a_n s_D(t-nT) = \theta^T \varphi(t) \quad \text{(eq. 6)}$$

$$\theta = (a_1 \ldots a_n)^T \quad \text{(eq. 7)}$$

$$\varphi(t) = (s_D(t-T) \ldots s_D(t-nT))^T \quad \text{(eq. 8)}$$

Hence, by measuring the Doppler related outputs, the value at the next sampling time instance can be predicted from old values. This requires that the filter is known. This issue is treated in the next subsection. The $^T$ means vector and matrix transpose, i.e. turning rows into columns and vice versa.

The second possible prediction method, i.e. the state space approach, starts by a formulation of the filter model (eq. 2) in state space form. This puts the model in a framework were the classical techniques of Kalman filtering can be applied. The details of this are not reproduced here since it can be found in numerous textbooks on optimal filtering.

Two characterizing aspects of the above methods need to be highlighted before proceeding.

i) The filter of the filter model $H(q^{-1})$ does not depend on time.

ii) The sampling rates of the models are constant.

Recursive Model Estimation

Now, the filter model is not perfectly constant in the VoLTE channel case, it rather varies with the speed of the wireless device and with the environment encountered by the contributing radio signals. It is therefore necessary to estimate the model on-line, with recursive methods. Also this is a technique that is well known in prior art. Many algorithms are available, also in this case either in filter form or state space form.

As will be seen the optimal prediction discussed above is an integrated part of the following standard recursive least squares estimator.

$$P(t) = \frac{(P(t-T) - P(t-T)\varphi(t)\varphi^T(t)P(t-T))}{\lambda(\lambda + \varphi^T(t)P(t-T)\varphi(t))} \quad \text{(eq. 9)}$$

$$K(t) = \frac{P(t)\varphi(t)}{\lambda + \varphi^T(t)P(t)\varphi(t)}$$

$$\hat{s}_D(t) = \varphi^T(t)\hat{\theta}(t-T)$$

$$\hat{\theta}(t) = \hat{\theta}(t-T) + K(t)(s_D(t) - \hat{s}_D(t))$$

It can again be seen that the sampling period is constant. In (eq. 9) P(t) is the estimated covariance matrix and K(t) is the update gain vector.

Problems with Existing Solutions

To get an efficient VoLTE solution in terms of both spectrum efficiency and battery efficiency it is important to keep the transmissions from the transmitter of the wireless device to a minimum since uplink transmissions create interference and consume precious battery wireless device. Therefore, the Sounding Reference Symbols (SRS) which is commonly used for channel quality estimation for best effort type of traffic is not a good design option.

Also, to save battery of the wireless device the DRX period needs to be kept as long as possible, maybe as long as 40 ms. This means that the only uplink transmissions that can be used for channel quality estimation are with a period of ~40 ms. Hence, for common speeds of wireless devices when a user is walking, the channel quality estimate can be outdated before it is used for scheduling and link adaptation of the next packet.

FIG. 4 shows the SINR estimation error for three different methods for channel quality estimation. In the "ideal" method the channel quality is available in the eNodeB in every subframe. However, since there is a delay between the scheduling and link adaptation for a VoLTE packet until the wireless device transmits the data, typically 4-5 ms for LTE Frequency Division Duplex (FDD), the channel will have time to change causing an error in the estimated channel quality.

A method of using the latest channel quality estimate is denoted the Zero-Order Hold (ZOH). This method is simple and works very well for slow moving wireless devices. However, as the speed of the wireless device increases the channel quality estimates will get more and more outdated when subsequent VoLTE packets are scheduled. At some point the channel will change almost completely between VoLTE packets, and then the performance of the ZOH method will be poor.

For fast wireless devices, i.e. for wireless devices for which the channel changes a lot between VoLTE packets the advantage of trying to use instantaneous channel knowledge is very limited. In that case the "average" method is a more sensible method. This method will instead use a long-term filtered channel quality and hence effectively reducing the maximum channel quality estimation error compared to the ZOH method.

FIG. 4 shows an accuracy of the SINR estimations for a typical VoLTE scenario. The pathloss is 120 dB and the wireless device speed is 7 km/h. Channel estimation using ZOH is a curve marked with one line and channel estimation using averaged channel gain is a curve marked with two lines.

Both under-estimation and over-estimation of the channel quality will lead to less efficient use of the channel. When the channel is over-estimated this will cause packets to be received incorrectly, e.g. Cyclic Redundancy Check (CRC) check fails. This will in turn require a retransmission of the same packet, and this retransmission also consumes channel resources. If, on the other hand the channel is under-estimated, this will lead to a use of too low MCS. And since a lower MCS means that fewer bits can be transmitted per PRB more PRBs has to be used to transmit the same packet. If these PRBs are not available the packet has to be segmented and transmitted in two separate, and maybe consecutive, TTIs.

As stated above, two constraints are valid for the optimal predictor and the recursive estimation algorithm to be valid. These require that the sampling period is constant and that the filter is also constant. However, this is not the case for the VoLTE channel, where channel measurements can occur with at least five different rates depending on the circumstances. This has substantial drawbacks, among these i) In order for the optimal predictor and estimator to be able to handle multiple sampling rates, the multiple sampling rates need to be run with the fastest rate. This means that the computational complexity per instance will be maximal, even when slower rate measurements are to be processed.

ii) In case of slower sampling rates, the missing measurements need to be replaced by something else. Even with such measurement replacements the obtained result won't be optimal.

iii) Fast sampling rates means that the poles of the estimated all-pole model approaches 1. This is known to cause numerical problems and numerical inaccuracy.

iv) As an alternative, one channel estimator could be used for each sampling rate, however that would also need to an increased complexity, without solving all problems above. In addition, the estimated model of the channel will be different for different sampling rates, hence it is unclear how to merge different models to enhance the link adaptation performance.

Thus, the performance of the wireless communication network may be reduced when using present techniques.

SUMMARY

It is therefore an object of embodiments herein to provide a mechanism that improves the performance of the wireless communication network and/or overcome at least one of the mentioned drawbacks.

According to an aspect the object is achieved by providing a method performed by a radio network node for enabling channel handling of a channel between a wireless device and the radio network node in a wireless communication network. The channel is defined in continuous time and a sampling rate of the channel is non-uniform. The radio network node predicts a channel gain using a first sampling descriptor indicating a first momentary sampling frequency and a second sampling descriptor indicating a second momentary sampling frequency. The first sampling descriptor operates on a different segment of continuous time than the second sampling descriptor. The predicted channel gain enables channel handling such as channel estimation and link adaptation.

According to an aspect the object is achieved by providing a radio network node for enabling channel handling of a channel between a wireless device and the radio network node in a wireless communication network. The channel is defined in continuous time and a sampling rate of the channel is non-uniform. The radio network node is configured to predict a channel gain using a first sampling descriptor indicating a first momentary sampling frequency and a second sampling descriptor indicating a second momentary sampling frequency. The first sampling descriptor operates on a different segment of continuous time than the second sampling descriptor. The predicted channel gain enables channel handling.

Embodiments herein disclose a new optimal prediction algorithm for channel gain with, in some embodiments, a corresponding channel estimator and a link adaptation, which automatically handles multiple and even varying sampling rates. E.g. the channel estimator produces the same parameter values, irrespective of the sampling rate applied, thus the predicted channel gain enables an improved channel estimation. Some embodiments herein disclose ways of using the predicted channel gain produced by the algorithm, to modify the signal used by the link adaptation, so that the link adaptation performs better. This in turn improves the performance of a scheduler of the radio network node. Embodiments herein enable an improved capacity in terms of the number of users and in terms of voice quality. Thus, this channel gain prediction disclosed herein leads to an improved performance of the wireless communication network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
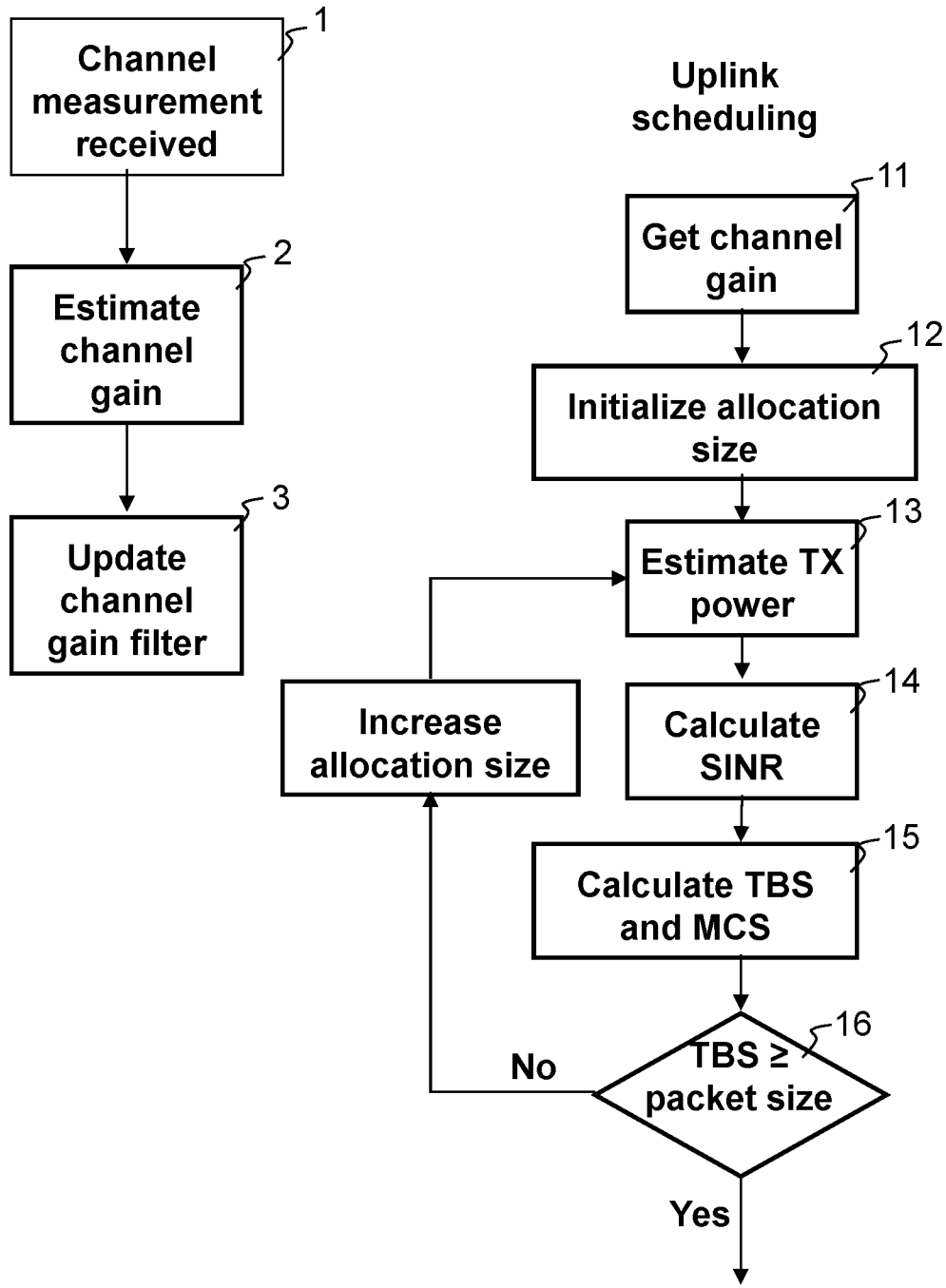
FIG. 1 shows a channel gain process and an uplink scheduling process.
Figure 2:
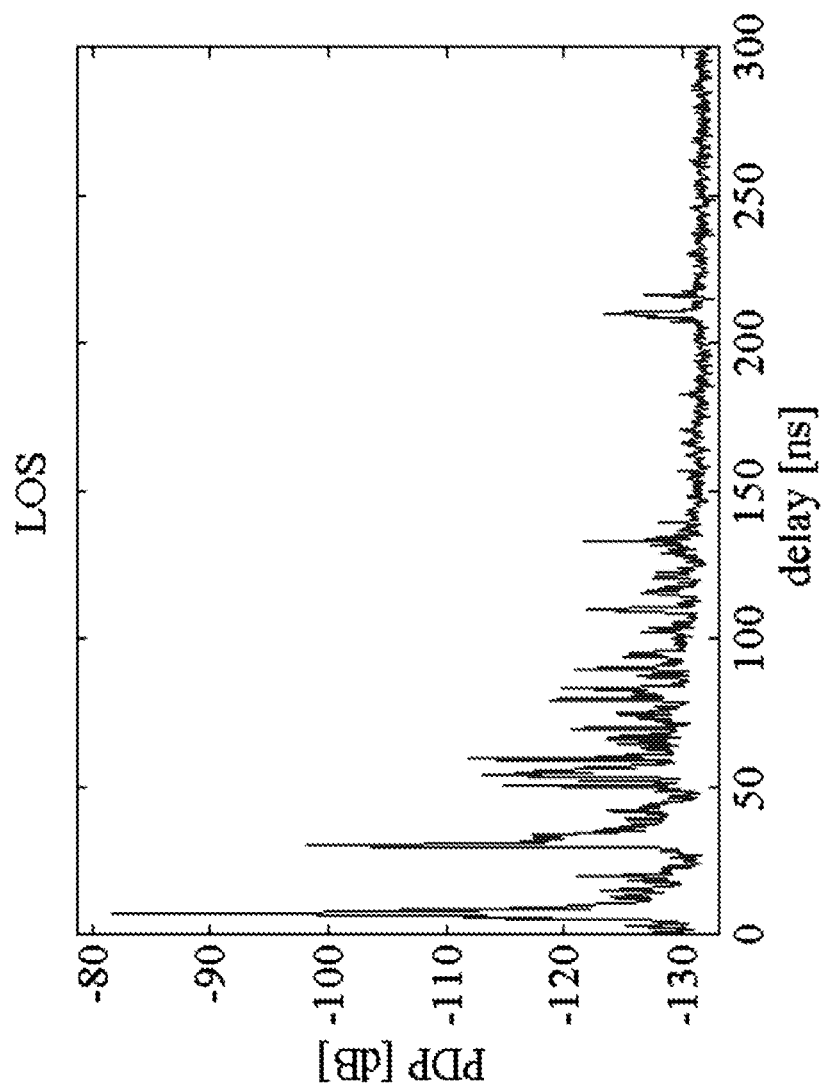
FIG. 2 shows a graph depicting the delay spread of a signal.
Figure 3:
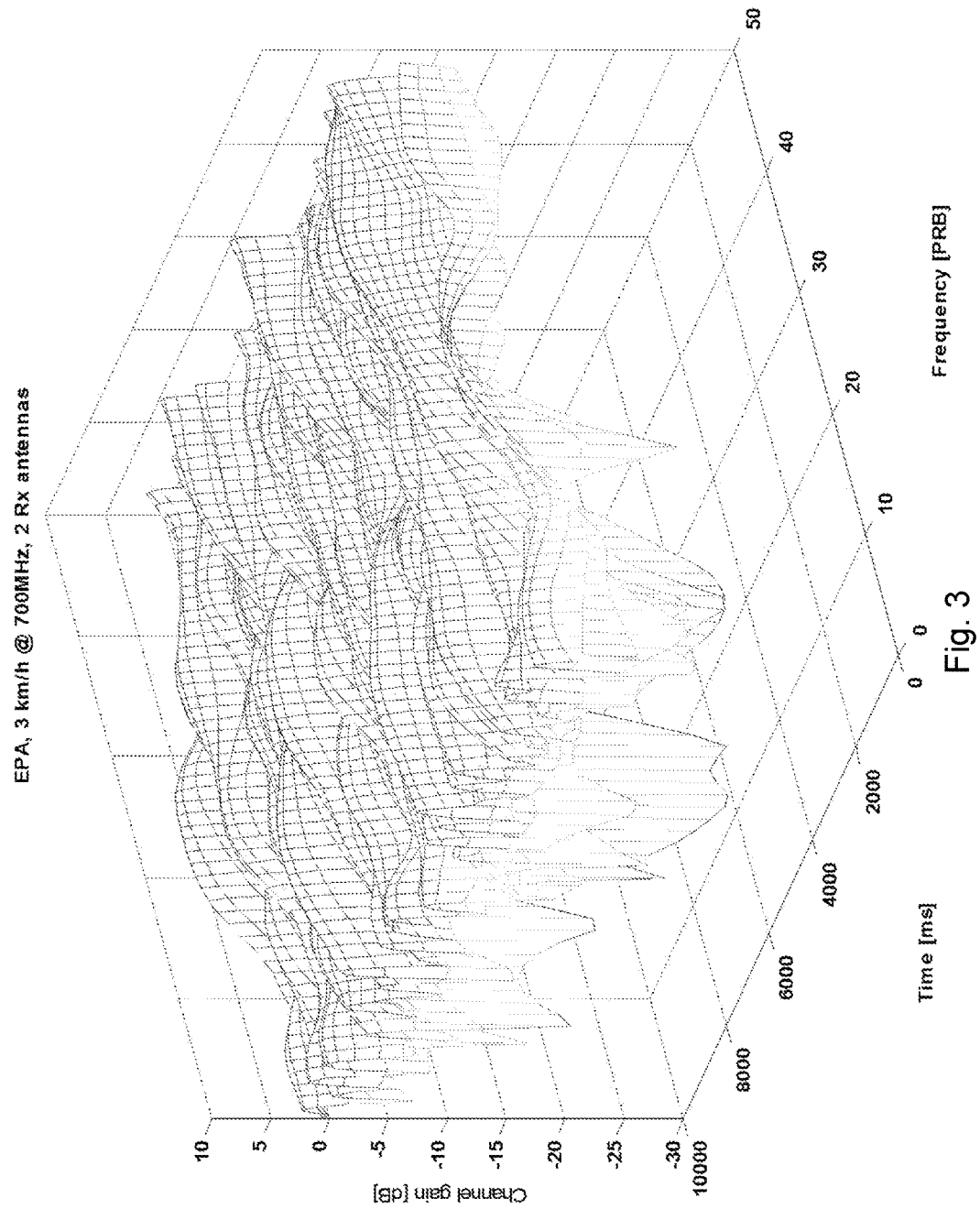
FIG. 3 shows the channel gain with a Doppler effect.
Figure 4:
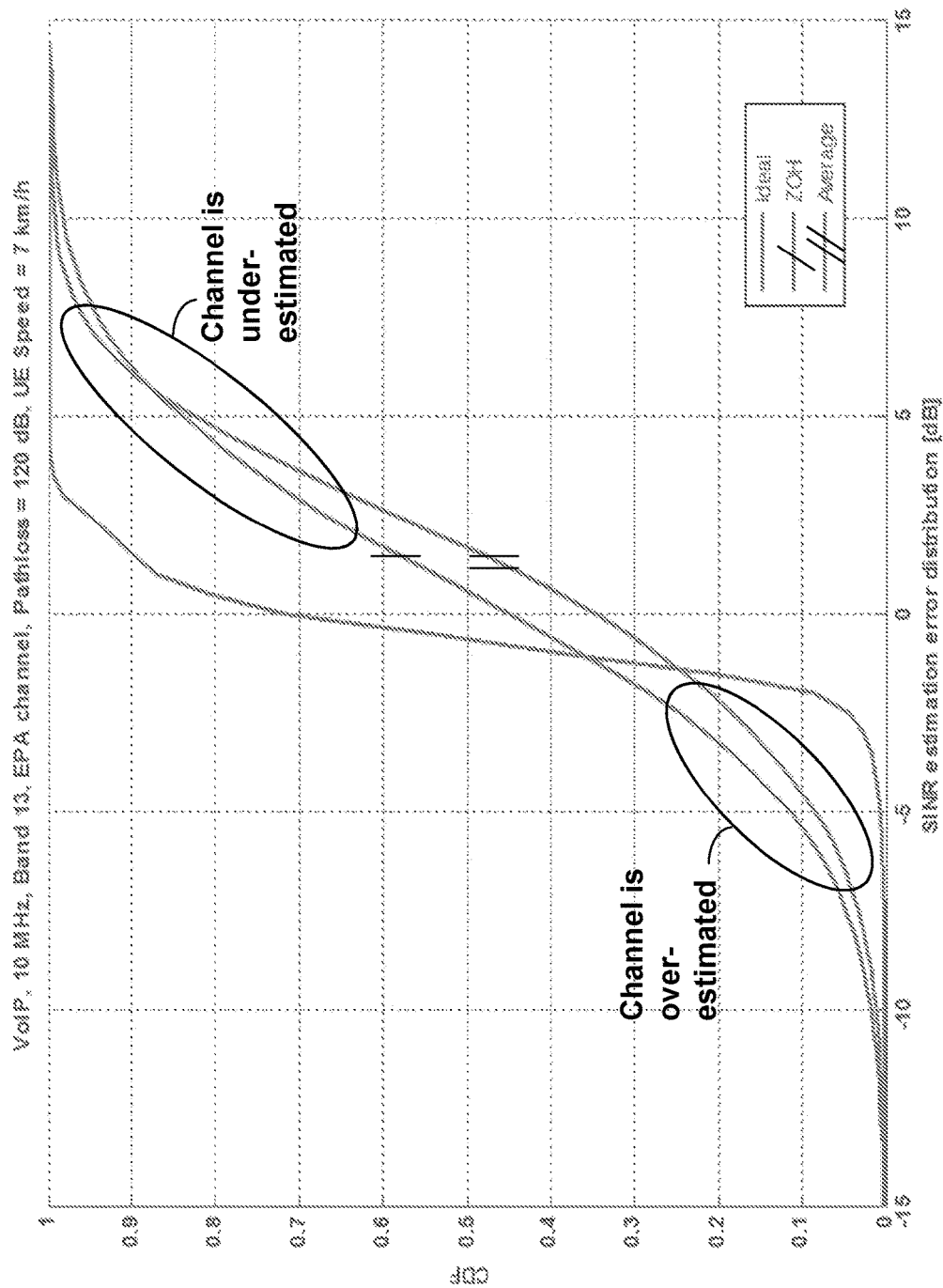
FIG. 4 shows an SINR estimation error for three different methods for channel estimation.

The figures are schematic and simplified for clarity, and they merely show details which are essential to the understanding of the embodiments presented herein, while other details have been left out. Throughout the disclosure, the same reference numerals are used for identical or corresponding parts or actions.

Figure 5:
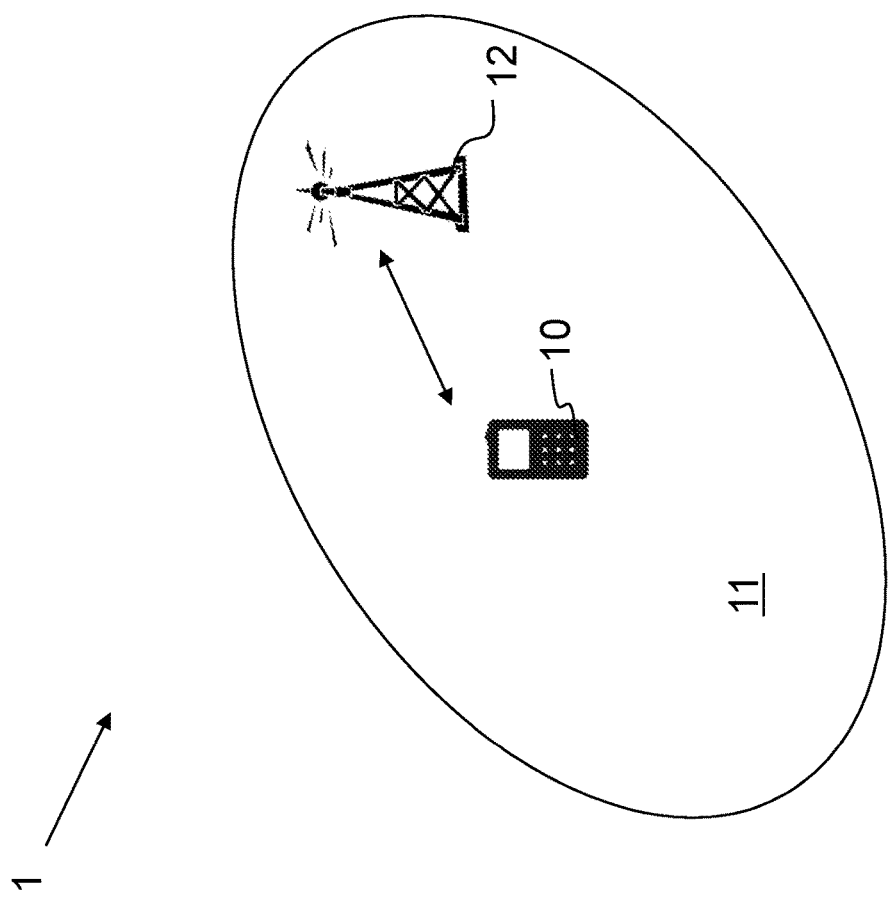
FIG. 5 shows an overview depicting a wireless communication network according to embodiments herein.

Embodiments herein relate to wireless communication networks in general. FIG. 5 is a schematic overview depicting a wireless communication network 1. The wireless communication network 1 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

In the wireless communication network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within respective cell.

The wireless communication network 1 covers a geographical area which is divided into cell areas, e.g. a cell 11 being served by a radio network node 12. The radio network node 12 may be a radio base station e.g. a NodeB, an evolved Node B (eNB, eNode B), a base transceiver station, an Access Point Base Station, a base station router, a WI-FI access point, or any other network unit capable of communicating with a wireless device within the cell served by the radio network node depending e.g. on the radio access technology and terminology used. The radio network node 12 may serve one or more cells or areas, such as the cell 11.

A cell is a geographical area where radio coverage is provided by radio equipment at e.g. a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 may also be broadcasted in the cell 11. The radio network node 12 communicates over a radio interface, also referred to as air interface, operating on radio frequencies with the wireless device 10 within range of the radio network node 12. The wireless device 10 transmits data over the radio interface to the radio network node 12 in Uplink (UL) transmissions and the radio network node 12 transmits data over the radio interface to the wireless device 10 in Downlink (DL) transmissions.

Embodiments herein disclose a channel gain prediction method and in some embodiments a corresponding channel estimator and link adaptor taking the prediction into account, which channel gain prediction automatically handles multiple and varying sampling rates. The channel estimation using the channel gain prediction produces the same parameter values, irrespective of the sampling rate applied, a fact that makes optimal channel gain prediction straightforward. The computational complexity is low and is similar as for the algorithm described by equation (eq. 9) above.

A Multi-Rate Channel Prediction Method

A problem indicated above with the complexity associated with the multiple sampling rates, is herein solved by providing the new channel gain prediction algorithm i.e. a channel gain prediction model with one or more of the following distinguishing features, The parameters of the channel gain prediction model are in continuous time, so called continuous time parameters.

A regression vector of the channel gain prediction model reflects the time varying actual sampling period.

The continuous time parameters of the channel gain prediction model may be estimated on-line, typically with e.g. a new recursive least squares algorithm.

A prediction of the channel gain, e.g. complex amplitude or power, is obtained by e.g. a linear prediction, where a continuous time estimated parameter vector is multiplied with a regression vector that reflects the varying sampling period.

As stated in the prior art section, the Doppler effect of the channel can be expressed in the frequency domain as a power spectrum, where a highest Doppler frequency corresponds to the speed of the wireless device 10. To model this spectrum the following continuous model may be used $$y(t) = \frac{1}{A(p)} e(t) \qquad \text{(eq. 10)}$$

$$A(p) = p^n + a_1 p^{n-1} + \ldots + a_n \qquad \text{(eq. 11)}$$

$$py(t) = \frac{dy(t)}{dt} \qquad \text{(eq. 12)}$$

Here p denotes a differentiation operator and $a_i$, i=1, ..., n are the continuous time parameters. y(t) denotes the output, either complex channel amplitude or power. Here A(p) is the spectral polynomial, that defines the Doppler spectrum in (eq. 10), and where the (eq. 12) is two equivalent ways of expressing a time derivative of the signal y(t).

The measurements are the channel output, e.g. the channel output is here defined to be either the real part of the complex channel, the imaginary part of the complex channel, or the power of the channel, i.e. the sum of the squared real and imaginary parts, at the uneven sampling instances, i.e.

$$y(t_0), y(t_0+k_1h), y(t_0+(k_1+k_2)h), \ldots y(t) \quad \text{(eq. 13)}$$

Here a fundamental sampling period, for VoLTE this is the 1 ms TTI, is given by h, while $k_1$ and $k_2$ are integers that model the momentary sampling period applied for e.g. VoLTE. $k_1$ and $k_2$ are also referred to herein as a first sampling descriptor indicating a first momentary sampling frequency and a second sampling descriptor indicating a second momentary sampling frequency, The next step is to replace the differentiation operator p of (eq. 10)-(eq. 12) with sequential approximations. Since the intention here is to obtain a low computational complexity, and since simulations have shown that an order of n=2 is sufficient, this approximation is illustrated for order 2. The extension to higher orders follows the same method, and embodiments should therefore not be limited to orders less than or equal to 2.

To begin, it holds that $$py(t_0) \approx \frac{q^{k_1}-1}{k_1 h} y(t_0) = \frac{y(t_0 + k_1 h) - y(t_0)}{k_1 h} \quad \text{(eq. 14)}$$

where a shift operator q shifts the time one fundamental sampling period h ahead in time. Proceeding in this way results in $$py(t_0 + k_1 h) \approx \frac{q^{k_2}-1}{k_2 h} y(t_0 + k_1 h) = \quad \text{(eq. 15)}$$

$$\frac{y(t_0 + (k_1 + k_2)h) - y(t_0 + k_1 h)}{k_2 h}$$

$$p^2(y(t_0)) = p(py(t_0)) \approx \frac{q^{k_1}-1}{k_1 h}(py(t_0)) \approx \quad \text{(eq. 16)}$$

$$\frac{py(t_0 + k_1 h) - py(t_0)}{k_1 h} \approx \frac{\frac{q^{k_2}-1}{k_2 h} q^{k_1} y(t_0) - \frac{q^{k_1}-1}{k_1 h} y(t_0)}{k_1 h} =$$

$$\frac{1}{h^2}\left(\frac{1}{k_1 k_2}q^{k_1+k_2} - \left(\frac{1}{k_1 k_2}+\frac{1}{k_1^2}\right)q^{k_1} + \frac{1}{k_1^2}\right)y(t_0)$$

It can be noted that the choice $k_1=k_2=1$ results in the familiar three point approximation of the second derivative of a signal.

To obtain a discrete time model, from (eq. 10)-(eq. 12), the following approximations are introduced $$py(t) \approx py(t_0) \quad \text{(eq. 17)}$$

$$p^2 y(t) \approx p^2 y(t_0) \quad \text{(eq. 18)}$$

These approximations state that the first and second derivatives at time r can be well approximated at time $t_0$. This is reasonable for low Doppler frequencies.

Employing (eq. 17) and (eq. 18) in (eq. 10), multiplying the resulting equation by $q^{k_1+k_2}$, and using the fact that in the case n=2 (eq. 13) implies $q^{k_1+k_2}y(t_0)=y(t)$, $q^{k_1}y(t_0)=q^{-k_2}y(t)$, $y(t_0)=q^{-(k_1+k_2)}y(t)$, then results in the filter equation $$y(t) = -a_1 k_2 h(y(t-k_2 h) - y(t-(k_1+k_2)h)) - \quad \text{(eq. 19)}$$

$$a_2 k_1 k_2 h^2 y(t-(k_1+k_2)h) + y(t-k_2 h) +$$

$$\frac{k_2}{k_1}(y(t-k_2 h) - y(t-(k_1+k_2)h)) + k_1 k_2 h^2 e(t)$$

The final step in the derivation of the discrete time model is then to write equation (eq. 19) in a linear regression form as $$y(t) = \varphi^T(t)\theta + c(t) + v(t) \quad \text{(eq. 20)}$$

$$\theta = (a_1 \quad a_2)^T \quad \text{(eq. 21)}$$

$$\varphi(t) = \quad \text{(eq. 22)}$$
$$(-k_2 h(y(t-k_2 h) - y(t-(k_1+k_2)h)) - k_1 k_2 h^2 y(t-(k_1+k_2)h))^T$$

$$c(t) = y(t-k_2 h) + \frac{k_2}{k_1}(y(t-k_2 h) - y(t-(k_1+k_2)h)) \quad \text{(eq. 23)}$$

$$v(t) = k_1 k_2 h^2 e(t) \quad \text{(eq. 24)}$$

The equations (eq. 20)-(eq. 24) are now directly suitable for prediction and on-line estimation. It can be noted that the estimation algorithm (eq. 20)-(eq. 24) will include the prediction (eq. 20) as one step.

Embodiments may use a so called recursive least squares algorithm. However, it should be noted that other alternatives exist and embodiments should not be limited to the use of the recursive least squares algorithm. The recursive least squares algorithm follows from standard results in the literature of estimation. The result is $$K(t) = \frac{P(t)\varphi(t)}{\lambda + \varphi^T(t)P(t)\varphi(t)} \quad \text{(eq. 25)}$$

$$\hat{y}(t) = \varphi^T(t)\hat{\theta}(t-k_2 h) + c(t) \quad \text{(eq. 26)}$$

$$\hat{\theta}(t) = \hat{\theta}(t-k_2 h) + K(t)(y(t) - \hat{y}(t)) \quad \text{(eq. 27)}$$

$$P(t) = \frac{(P(t-k_2 h) - P(t-k_2 h)\varphi(t)\varphi^T(t)P(t-k_2 h))}{\lambda(\lambda + \varphi^T(t)P(t-k_2 h)\varphi(t))} \quad \text{(eq. 28)}$$

Above, (eq. 25) computes an update gain K(t) in terms of a covariance matrix P(t), the regression vector φ(t) (eq. 22) and a forgetting factor λ. The channel prediction, ŷ(t), is then computed in (eq. 26) by vector multiplication of the estimated channel parameters θ̂(t−$k_2$h) of the previous steps, i.e. (eq. 22) and (eq. 23). Using the last measurement y(t) the new channel estimate is then updated in (eq. 27). Finally, the covariance matrix P(t) is updated in (eq. 28).

This completes the description of the algorithm for adaptive channel gain prediction.

Figure 6:
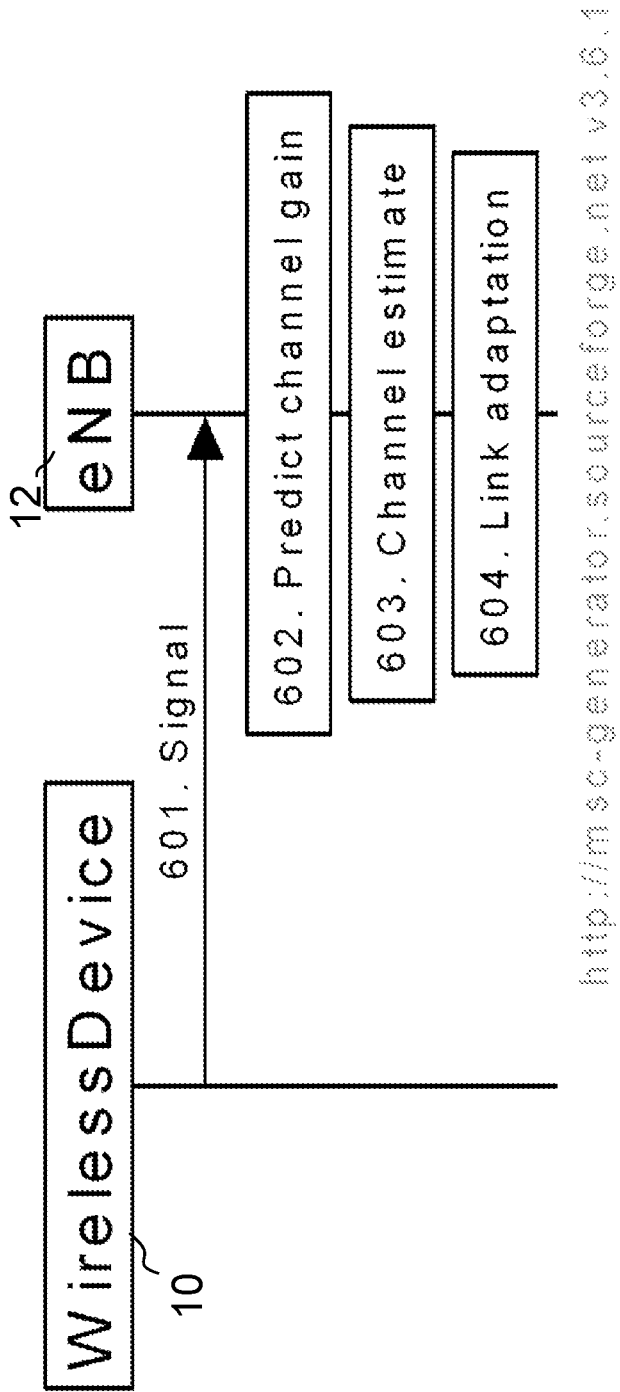
FIG. 6 shows a combined flowchart and signaling scheme according to embodiments herein.

FIG. 6 is a combined flowchart and signaling scheme according to some embodiments herein.

Action 601. The wireless device 10 transmits a signal over a channel to the radio network node 12.

Action 602. The radio network node 12 predicts a channel gain for the channel using a first sampling descriptor k, and a second sampling descriptor $k_2$. $k_1$ indicates a first momentary sampling frequency and $k_2$ indicates a second momentary sampling frequency. The first sampling descriptor $k_1$ operates on a different segment of continuous time than the second sampling descriptor $k_2$, hence, these descriptors reflect varying sampling periods. The predicted channel gain enables channel handling such as channel estimation and/or link adaptation as the predicted channel gain is used in these processes.

Action 603. The radio network node 12 may then use the predicted channel gain in a channel estimation e.g. making an SINR estimation.

Action 604. The radio network node 12 may use the channel estimation when performing a link adaptation and hence the radio network node 12 may perform link adaptation based on the predicted channel gain.

Figure 7:
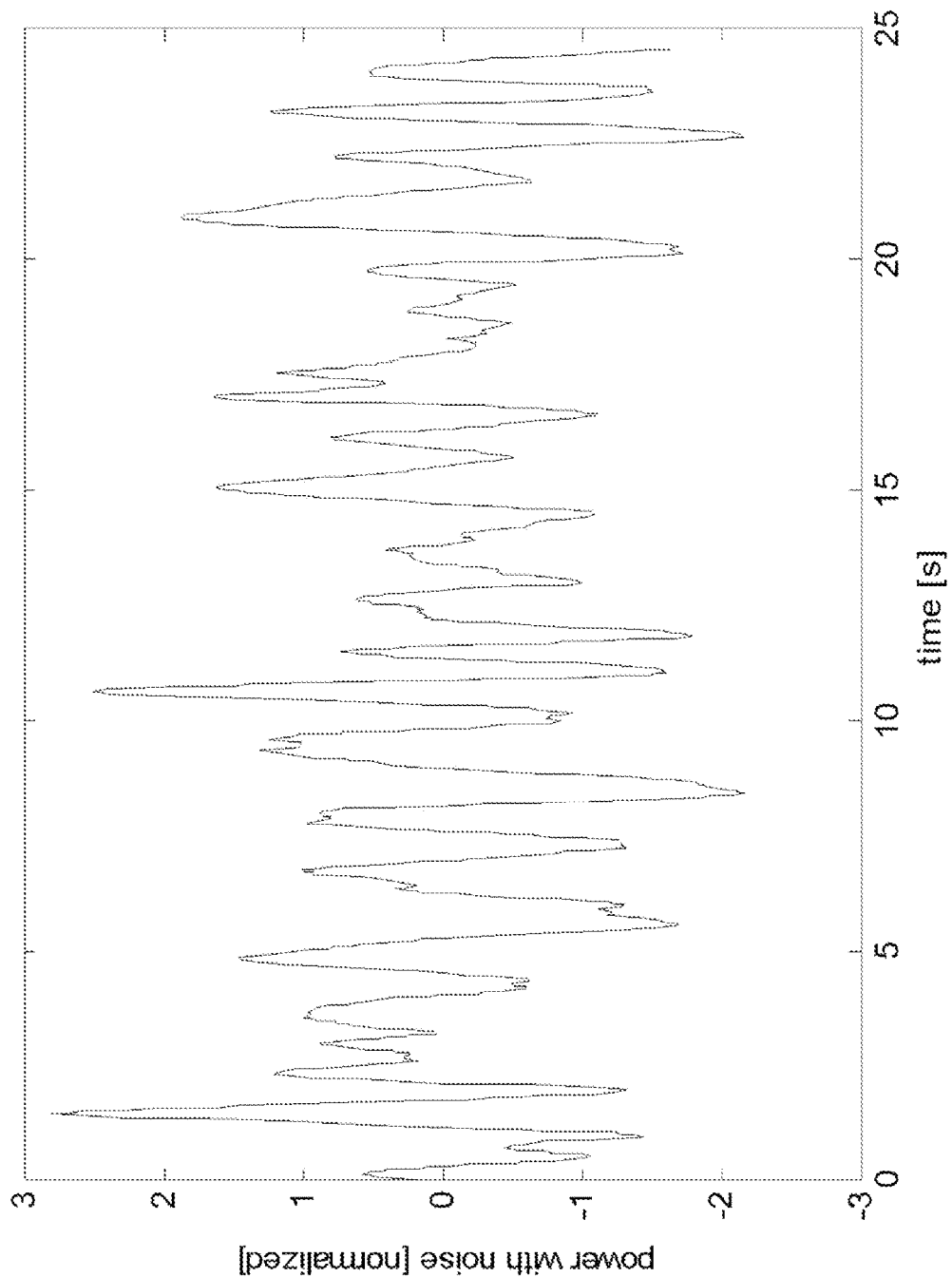
FIG. 7 shows non-uniformly sampled data, on average $1/25^{th}$ of all samples are used, i.e. the average sampling rate is 40 Hz.

To illustrate the performance of embodiments herein, a case with a Doppler frequency of 5 Hz was selected. The sampling rate was random. The data is shown in FIG. 7. FIG. 7 shows non-uniformly sampled data, on average $\frac{1}{25}^{th}$ of all samples are used, i.e. the average sampling rate is 40 Hz. Time is defined along a horizontal axis and power with noise [normalized] is defined along a vertical axis.

Figure 8:
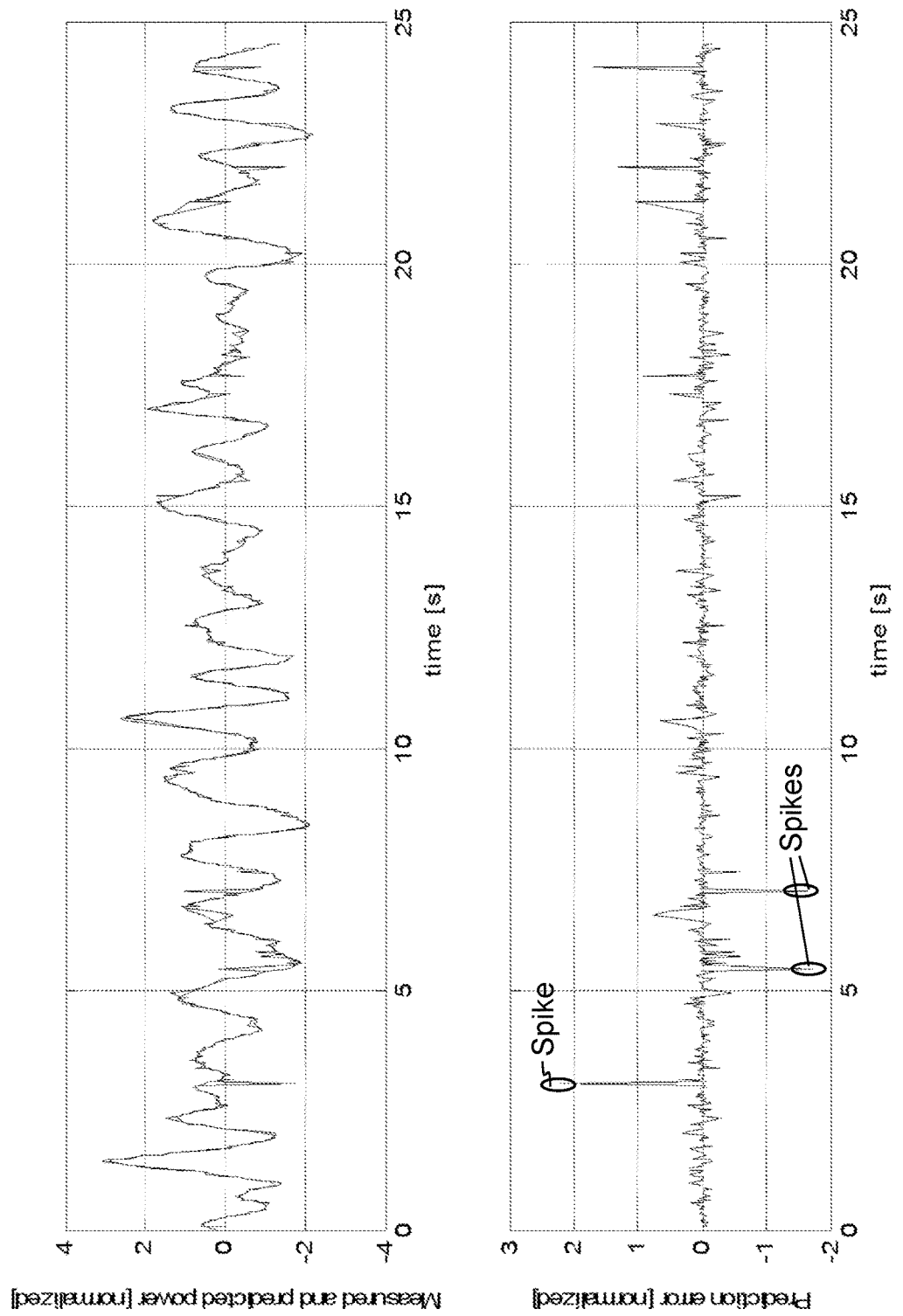
FIG. 8 shows a graph depicting prediction error.

FIG. 8. The predicted channel gain and the actual channel gain appear in the top figure, while the prediction error is shown in the bottom picture. Time is defined along a horizontal axis and measured and predicted power [normalized] is defined along a vertical axis in the top figure. Time is defined along a horizontal axis and prediction error [normalized] is defined along a vertical axis in the bottom figure. There are some spikes in the predicted errors which are due to channel samples taken too close to one another.

Channel Measurement Embodiment

In some embodiments herein several instances of the algorithm defined by (eq. 20)-(eq. 28) are run. All quantities of the two algorithms are independent. A first instance of the algorithm represents the real part of the complex channel gain and it is driven by measurements of this quantity. A second instance of the algorithm represents the imaginary part of the complex channel and it is driven by measurements of this quantity. Note that in this case the complex channel differs between antenna elements, hence two instances of (eq. 20)-(eq. 28), i.e. two channel gain predictors, are needed per antenna element. This embodiment gives a better result being more accurate than when using merely one channel gain predictor.

Power Measurement Embodiment

In this embodiment, one instance, one channel gain predictor, of the algorithm (eq. 20)-(eq. 28) is run. The algorithm represents the channel power and is driven by measurements of this quantity. Only one channel gain predictor for all antenna elements is used leading to a non-complex solution but with less accurate results than the one above.

Figure 9:
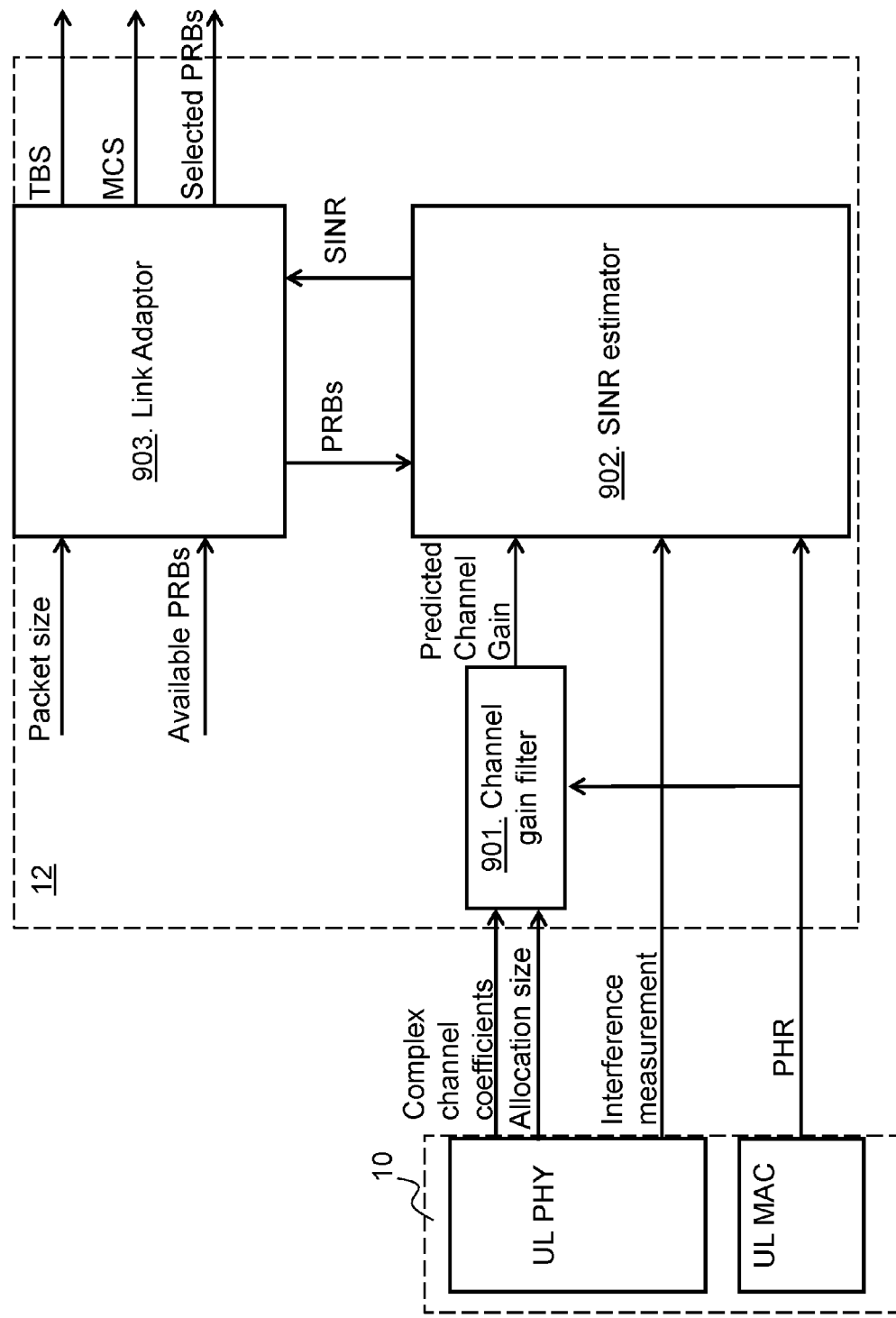
FIG. 9 shows a link adaptation apparatus according to embodiments herein.

FIG. 9 is a block diagram depicting a link adaptation apparatus being an example of the radio network node 12. The wireless device 10 transmits signals to the radio network node 12. E.g. UL physical layer (UL PHY) in the wireless device 10 provides the radio network node 12 with complex channel coefficients and allocation size to a channel gain filter 901 in the radio network node 12. Furthermore, an interference measurement is provided to a SINR estimator 902 at the radio network node 12 from the UL PHY. A UL Medium Access Control layer at the wireless device 10 may provide power headroom reports (PHR) to the SINR estimator 902. This PHR may also be provided to the channel gain filter 901. In the channel gain filter 901 the methods described above is performed resulting in a predicted channel gain. This predicted channel gain is then fed to the SINR estimator 902. The SINR estimator 902 performs the channel estimation resulting in SINR for available PRBs. These available PRBs are provided from a Link Adaptor 903. The link adaptor 903 obtains the SINR from the SINR estimator 902 and also packet size from within the radio network node 12. The link adaptor 902 then determines TBS, MCS, and selected PRBs for transmission based on the estimated SINR and thus the predicted channel gain.

In some embodiments herein certain safety measures may be applied to the methods and apparatuses to e.g. avoid the spikes in FIG. 8. These safety measures are acting as safety nets, in order to provide a solution with enhanced and robust performance avoiding making poor channel gain predictions.

Figure 10:
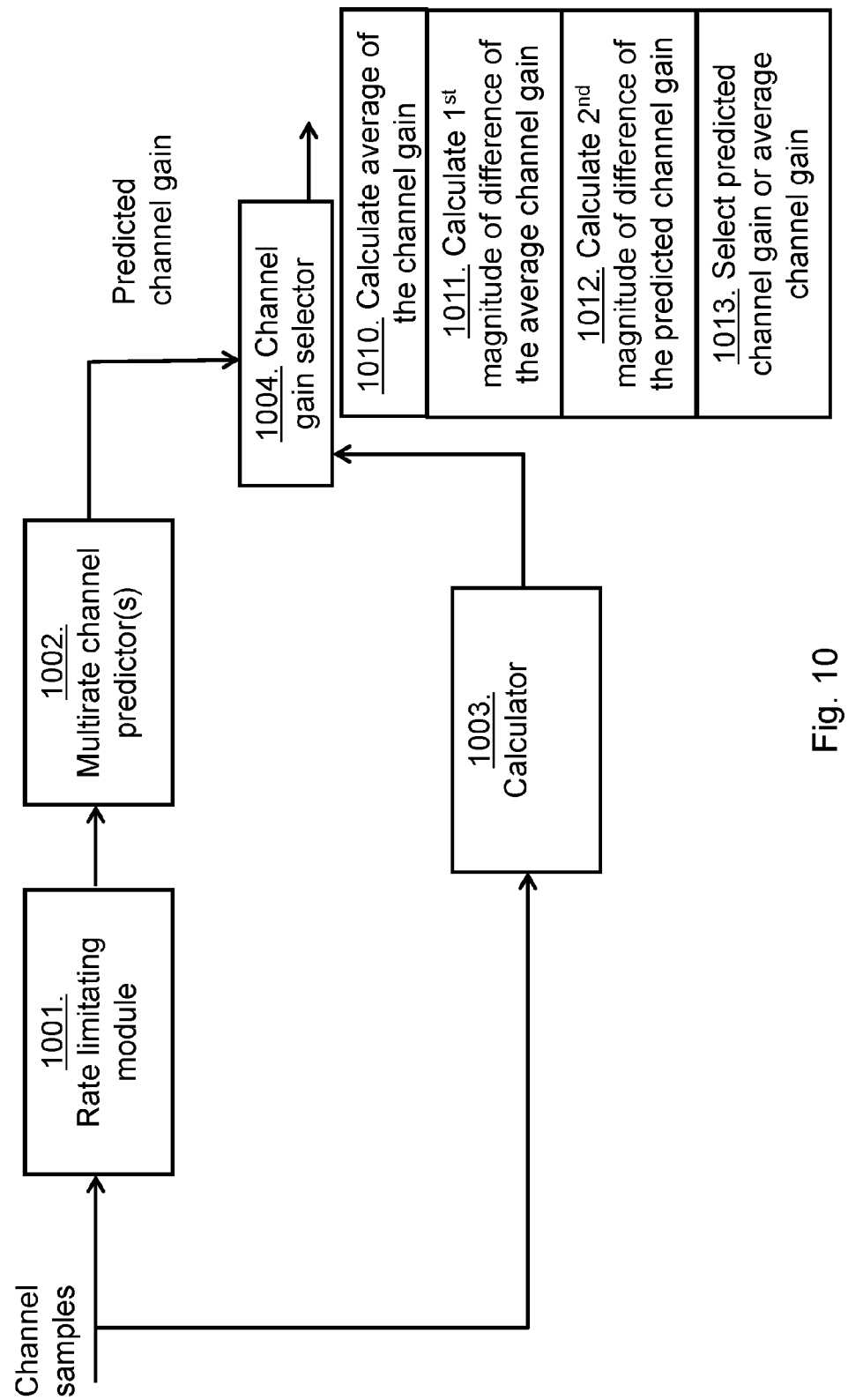
FIG. 10 shows a channel estimation process according to embodiments herein.

FIG. 10 depicts an example of a channel gain predictor arrangement and the method of which may be implemented as a part of the channel gain filter 901 in FIG. 9.

Channel samples are fed into the radio network node 12. The radio network node 12 may update a rate limitation or sampling rate limitation at a rate limiting module 1001. As mentioned above the sampling of the channel becomes non-uniform when retransmissions and segmentation are used (see table I). A typical scenario is that a VoLTE packet is segmented into two segments and transmitted in two consecutive TTIs and the next transmission is performed 20 ms or 40 ms later. The transmissions will result in channel measurements, and due to the short time between the segmented transmissions any measurement noise will be amplified when predicting the channel quality e.g. 40 ms later. A method to avoid this noise amplification is to limit the rate at which measurements are fed into one or more multirate channel gain predictor(s) 1002. This limitation can be done in some different ways, e.g.

a. Only feed channel samples to the multirate channel gain predictor when the time since the latest sample is longer than a threshold $t_{th1}$, indicating a threshold rate. Channel samples too close one another in time gives a large prediction error, see FIG. 8.

b. Average channel samples that are received within a certain time window and only feed the averaged channel samples to the multirate predictor.

In case the measurements are fed to the multirate channel gain predictor 1002, the multirate channel gain predictor 1002 predicts channel gain according to embodiments herein.

The radio network node 12 may further fall back to the average the channel gain when appropriate. When the Doppler spread for the wireless device 10 is high or the time between uplink transmissions is large the channel autocorrelation approaches zero. In these cases it is preferable to fall back to an average of the channel gain of the channel samples. This averaged channel gain may be computed in a calculator 1003.

The radio network node 12 may further comprise a channel gain selector 1004 for selecting the predicted channel gain or the averaged channel gain. A criterion for using the averaged channel gain compared to the predicted channel gain may be based on an estimated error from the two different methods according to the selecting process described in actions 1010-1013.

Action 1010. The radio network node 12, e.g. the calculator 1003, may calculate average of the channel gain by filtering the channel samples.

Action 1011. The radio network node 12, e.g. the channel gain selector 1004, may calculate the magnitude of the difference, in dB, between received channel samples, i.e. an actual channel gain of previous channel samples, and the averaged channel gain.

Action 1012. The radio network node 12, e.g. the channel gain selector 1004, may calculate the magnitude of the difference, in dB, between received channel samples, i.e. an actual channel gain of previous channel samples, and the predicted channel gain.

Action 1013. The radio network node 12, e.g. the channel gain selector 1004, may then select the method, prediction or average, that gives the minimum expected error based on the results from actions 1011 and 1012 above.

The output from action 1013 may then be the channel gain prediction that is used to calculate the SINR used for Link Adaptation of uplink transmissions.

Figure 11:
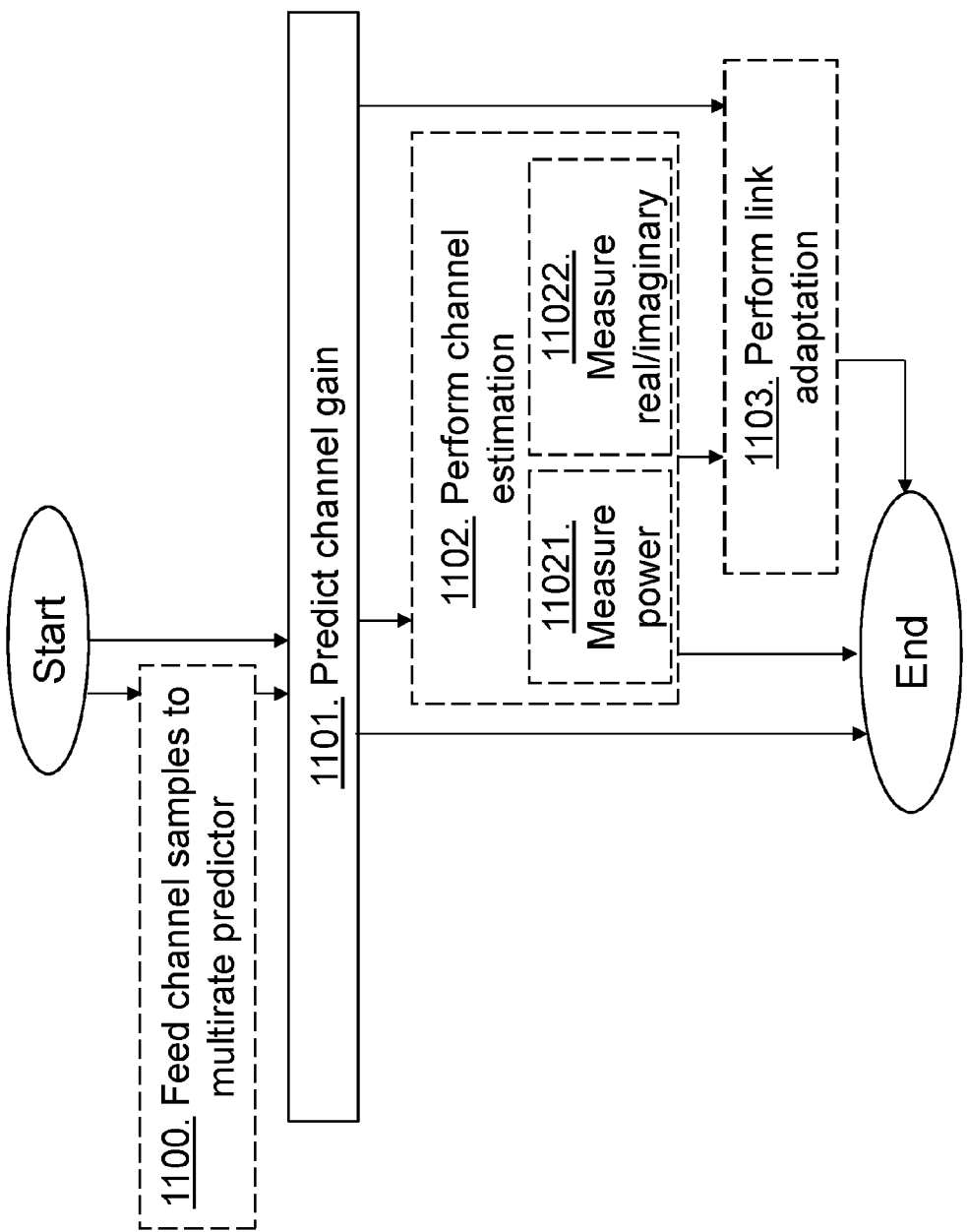
FIG. 11 shows a flowchart depicting a method performed by a radio network node according to embodiments herein.

The method actions in the radio network node 12 for enabling channel handling of a channel between the wireless device 10 and the radio network node 12 in the wireless communication network 1 according to some embodiments will now be described with reference to a flowchart depicted in FIG. 11. Channel handling covers e.g. channel estimation and link adaptation. The channel is defined in continuous time and a sampling rate of the channel is non-uniform e.g. the sampling rate covers different sampling periods such as the five measurement rates of the different states in Table I above. Actions performed in some embodiments are marked with dashed boxes.

Action 1100. The radio network node 12 may feed, when the sampling rate being below a threshold rate, the channel samples into a multirate predictor performing the prediction. Hence, the radio network node 12 limits the rate of sampling to be below the threshold rate. When the sampling rate is equal or above the threshold rate, the radio network node 12 may average the channel samples instead to obtain an averaged channel gain estimate. I.e. when a condition is fulfilled, the radio network node 12 may average the channel gain of the channel samples instead to obtain an averaged channel gain estimate.

Action 1101. The radio network node 12 predicts the channel gain using a first sampling descriptor indicating a first momentary sampling frequency and a second sampling descriptor indicating a second momentary sampling frequency. The first sampling descriptor operates on a different segment of continuous time than the second sampling descriptor. The predicted channel gain enables channel handling. The radio network node 12 may predict the channel gain by obtaining the channel gain by a linear prediction, wherein a continuous time estimated parameter vector is multiplied with a regression vector obtained using the first and second sampling descriptors reflecting varying sampling periods.

The predicted channel gain at time t, ŷ(t), is defined by $$\hat{y}(t)\varphi^T(t)\hat{\theta}(t-k_2h)+c(t)$$

where φ(t) is the regression vector at time t;
θ̂(t–$k_2$h) is a channel estimate at a time taking the second sampling descriptor into account; and
c(t) is a parameter independent part of the prediction.

The regression vector φ(t) may be defined as $$\varphi(t)=(-k_2h(y(t-k_2h)-y(t-(k_1+k_2)h))-k_1k_2h^2y(t-(k_1+k_2)h))^T$$

where h is a fundamental sampling period; and
y is a measured channel gain.

The parameter independent part of the prediction, c(t), may be defined as $$c(t) = y(t-k_2h) + \frac{k_2}{k_1}(y(t-k_2h) - y(t-(k_1+k_2)h))$$

where h is a fundamental sampling period; and
y is a measured channel gain.

The channel may be defined in terms of a parameter vector, being a continuous time estimated parameter vector, as $$\theta=(a_1 a_2)^T$$

where $a_1$ $a_2$ are the continuous time parameters.

The channel may be supporting segmenting and retransmission of packets, and may additionally or alternatively support discontinuous reception. The channel may be for carrying VoLTE packets.

Action 1102. The radio network node 12 may then perform a channel estimation using the predicted channel gain. E.g. action 11021, the radio network node 12 may measure power over the channel for channel estimation or, action 11022, the radio network node 12 may measure a real part of a complex channel gain and an imaginary part of the complex channel gain for channel estimation. In order to select a channel gain to use in the channel estimation the radio network node 12 may calculate the average of the channel gain by filtering channel samples; calculate a first magnitude of difference between received channel samples and the calculated average of the channel gain; calculate a second magnitude of difference between the received channel samples and the predicted channel gain; and select the predicted channel gain or the calculated average of the channel gain which ever gives a minimum expected error based on the calculated first and second magnitudes.

Action 1103. The radio network node 12 may further perform a link adaptation using the predicted channel gain.

Embodiments herein provide a solution where the predicted channel gain is closer to the actual channel gain resulting in a VoLTE capacity increase—more users per cell; VoLTE performance enhancement—better audio quality for users; Low implementation complexity—one or two multirate predictors per wireless device; and/or High channel tracking bandwidth—all data fused by one or two multirate predictors.

Figure 12:
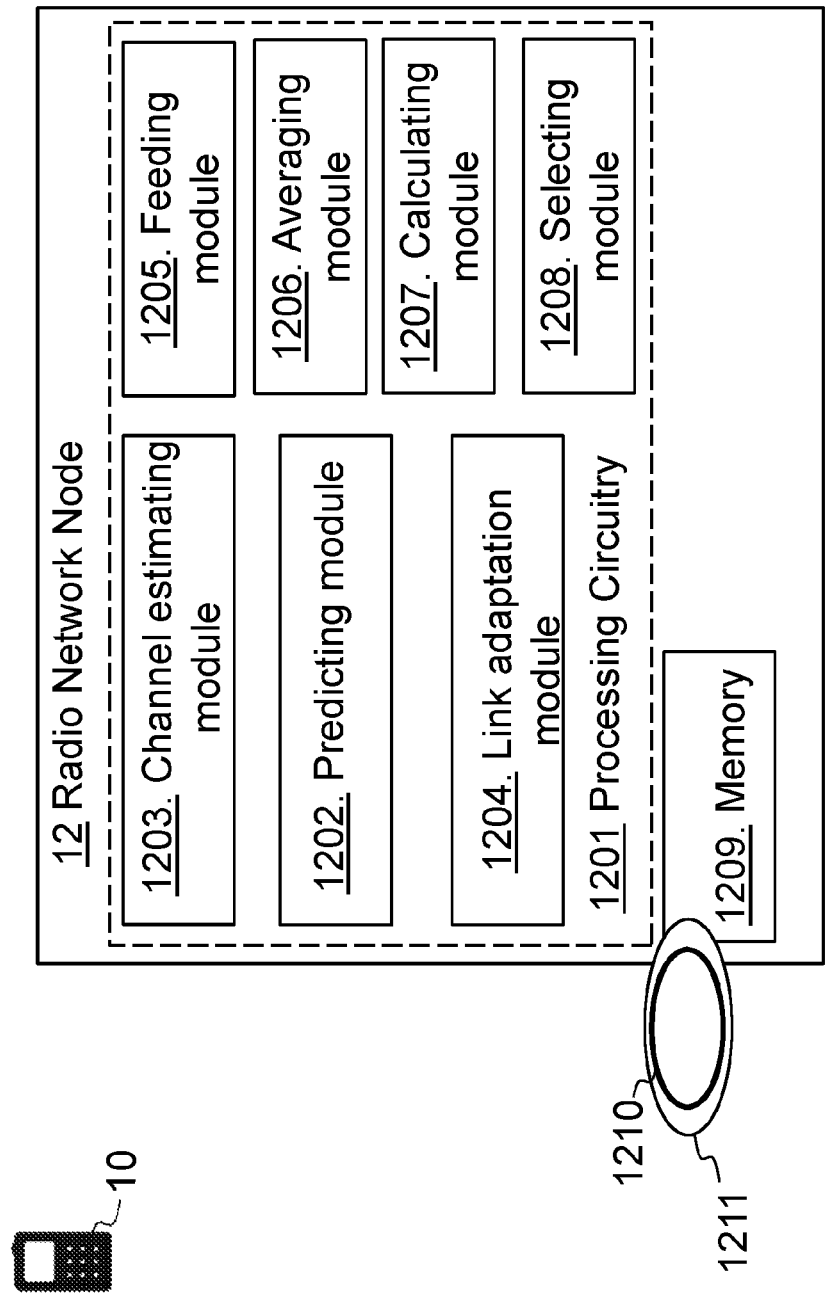
FIG. 12 shows a block diagram depicting a radio network node according to embodiments herein.

In order to perform the methods disclosed herein a radio network node 12 is provided. FIG. 12 is a block diagram depicting the radio network node 12 for enabling channel handling of a channel between the wireless device 10 and the radio network node 12 in the wireless communication network 1. The channel is defined in continuous time and a sampling rate of the channel is non-uniform.

The radio network node 12 is configured to predict a channel gain using a first sampling descriptor indicating a first momentary sampling frequency and a second sampling descriptor indicating a second momentary sampling frequency. The first sampling descriptor operates on a different segment of continuous time than the second sampling descriptor, which predicted channel gain enables channel handling. The radio network node 12 may further be configured to predict the channel gain by obtaining the channel gain by a linear prediction, wherein the radio network node 12 is configured to multiply a continuous time estimated parameter vector with a regression vector obtained using the first and second sampling descriptors reflecting varying sampling periods. The radio network node 12 may further be configured to predict channel gain at time t, ŷ(t), from $$\hat{y}(t)\varphi^T(t)\hat{\theta}(t-k_2h)+c(t)$$

where φ(t) is a regression vector at time t
θ̂(t–$k_2$h) is a channel estimate at a time taking the second sampling descriptor into account; and
c(t) is the parameter independent part of the prediction.

The regression vector $\varphi(t)$ may be defined as $$\varphi(t)=(-k_2h(y(t-k_2h)-y(t-(k_1+k_2)h))-k_1k_2h^2y(t-(k_1+k_2)h))^T$$

where h is a fundamental sampling period
and y is a measured channel gain.

The parameter independent part of the prediction, c(t) may be defined as $$c(t) = y(t - k_2h) + \frac{k_2}{k_1}(y(t - k_2h) - y(t - (k_1 + k_2)h))$$

where h is a fundamental sampling period; and
y is a measured channel gain.

The channel may be defined in terms of a parameter vector, being a continuous time estimated parameter vector, as $$\theta=(a_1 a_2)^T$$

where $a_1$ $a_2$ are the continuous time parameters.

The channel may be supporting segmenting and retransmission of packets, and may additionally or alternatively support discontinuous reception. The channel may be for carrying VoLTE packets.

The radio network node 12 may further be configured to perform a channel estimation using the predicted channel gain. Then, the radio network node 12 may further be configured to measure power over the channel for channel estimation, or the radio network node 12 may further be configured to measure a real part of a complex channel gain and an imaginary part of the complex channel gain for channel estimation.

The radio network node 12 may further be configured to perform a link adaptation using the predicted channel gain.

The radio network node 12 may further be configured to, when the sampling rate being below a threshold rate, feed channel samples into a multirate predictor performing the prediction. The radio network node 12 may further be configured to, when the sampling rate being equal or above the threshold rate, average the channel samples instead to obtain an averaged channel gain estimate.

The radio network node 12 may further be configured to calculate an average of the channel gain by filtering channel samples; calculate a first magnitude of difference between received channel samples and the calculated average of the channel gain; calculate a second magnitude of difference between the received channel samples and the predicted channel gain; and to select the predicted channel gain or the calculated average of the channel gain which ever gives a minimum expected error based on the calculated first and second magnitudes.

The radio network node 12 may comprise processing circuitry 1201. The radio network node 12 may further comprise a predicting module 1202, e.g. the channel gain filter 901. The predicting module 1202 and/or the processing circuitry 1201 may be configured to predict a channel gain using a first sampling descriptor indicating a first momentary sampling frequency and a second sampling descriptor indicating a second momentary sampling frequency. The first sampling descriptor operates on a different segment of continuous time than the second sampling descriptor, which predicted channel gain enables channel handling. The predicting module 1202 and/or the processing circuitry 1201 may further be configured to predict the channel gain by obtaining the channel gain by a linear prediction, wherein the predicting module 1202 and/or the processing circuitry 1201 is configured to multiply a continuous time estimated parameter vector with a regression vector obtained using the first and second sampling descriptors reflecting varying sampling periods. The predicting module 1202 and/or the processing circuitry 1201 may further be configured to predict channel gain at time t, $\hat{y}(t)$, from $$\hat{y}(t)\varphi^T(t)\hat{\theta}(t-k_2h)+c(t)$$

where $\varphi(t)$ is a regression vector at time t
$\hat{\theta}(t-k_2h)$ is a channel estimate at a time taking the second sampling descriptor into account; and
c(t) is the parameter independent part of the prediction.

The regression vector $\varphi(t)$ may be defined as $$\varphi(t)=(-k_2h(y(t-k_2h)-y(t-(k_1+k_2)h))-k_1k_2h^2y(t-(k_1+k_2)h))^T$$

where h is a fundamental sampling period
and y is a measured channel gain.

The parameter independent part of the prediction, c(t) may be defined as $$c(t) = y(t - k_2h) + \frac{k_2}{k_1}(y(t - k_2h) - y(t - (k_1 + k_2)h))$$

where h is a fundamental sampling period; and
y is a measured channel gain.

The channel may be defined in terms of a parameter vector, being a continuous time estimated parameter vector, as $$\theta=(a_1 a_2)^T$$

where $a_1$ $a_2$ are the continuous time parameters.

The channel may be supporting segmenting and retransmission of packets, and may additionally or alternatively support discontinuous reception. The channel may be for carrying VoLTE packets.

Furthermore, the radio network node 12 may comprise a channel estimating module 1203, e.g. the SINR estimator 902. The channel estimating module 1203 and/or the processing circuitry 1201 may be configured to perform a channel estimation using the predicted channel gain. Then, the channel estimating module 1203 and/or the processing circuitry 1201 may further be configured to measure power over the channel for channel estimation, or the channel estimating module 1203 and/or the processing circuitry 1201 may further be configured to measure a real part of a complex channel gain and an imaginary part of the complex channel gain for channel estimation.

The radio network node 12 may comprise a link adaptation module 1204, e.g. a scheduler and/or the link adaptor 903. The link adaptation module 1204 and/or the processing circuitry 1201 may be configured to perform a link adaptation using the predicted channel gain.

The radio network node 12 may comprise a feeding module 1205. The feeding module 1205 and/or the processing circuitry 1201 may further be configured to, when the sampling rate is below a threshold rate, feed channel samples into a multirate predictor performing the prediction. The radio network node 12 may comprise an averaging module 1206. The averaging module 1206 and/or the processing circuitry 1201 may further be configured to, when the sampling rate is equal or above the threshold rate, average the channel samples instead to obtain an averaged channel gain estimate.

The radio network node 12 may further comprise a calculating module 1207 and a selecting module 1208. The calculating module 1207 and/or the processing module 1201 may be configured to calculate an average of the channel gain by filtering channel samples, and to calculate a first magnitude of difference between received channel samples and the calculated average of the channel gain. The calculating module 1207 and/or the processing module 1201 may further be configured to calculate a second magnitude of difference between the received channel samples and the predicted channel gain. The selecting module 1208 and/or the processing circuitry 1201 may be configured to select the predicted channel gain or the calculated average of the channel gain which ever gives a minimum expected error based on the calculated first and second magnitudes.

The radio network node 12 further comprises a memory 1209. The memory 1209 comprises one or more units to be used to store data on, such as channel gains, predicted channel gains, channel estimations, SINRs, averaged channel gains, link adaptation values, applications to perform the methods disclosed herein when being executed, and similar.

The methods according to the embodiments described herein for the radio network node 12 may be implemented by means of e.g. a computer program 1210 or a computer program product, comprising instructions, i.e., software code portions, which, when executed on at least one processor, cause the at least one processor to carry out the actions described herein, as performed by the radio network node 12. The computer program 1210 may be stored on a computer-readable storage medium 1211, e.g. a disc or similar. The computer-readable storage medium 1211, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of radio access network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and radio node taught herein. As such, the radio node and techniques taught herein are not limited by the foregoing description and accompanying drawings. Instead, the embodiments herein are limited only by the following claims and their legal equivalents.

The invention claimed is:

1. A method performed by radio network node for enabling channel handling of a channel between a wireless device and the radio network node in a wireless communication network wherein the channel is defined in continuous time and a sampling rate of the channel is non-uniform; the method comprising
   predicting a channel gain using a first sampling descriptor indicating a first momentary sampling frequency and a second sampling descriptor indicating a second momentary sampling frequency, wherein the first sampling descriptor operates on a different segment of continuous time than the second sampling descriptor, which predicted channel gain enables channel handling.

2. The method according to claim 1, wherein the predicting the channel gain comprises obtaining the channel gain by a linear prediction, wherein a continuous time estimated parameter vector is multiplied with a regression vector obtained using the first and second sampling descriptors reflecting varying sampling periods.

3. The method according to claim 1, wherein the predicted channel gain at time t, $\hat{y}(t)$, is defined by $$\hat{y}(t)\varphi^T(t)\hat{\theta}(t-k_2h)+c(t)$$

where $\varphi(t)$ is a regression vector at time t
$\hat{\theta}(t-k_2h)$ is a channel estimate at a time taking the second sampling descriptor into account; and
$c(t)$ is a parameter independent part of the prediction.

4. The method according to claim 3, wherein the regression vector $\varphi(t)$ is defined as $$\varphi(t) = (-k_2 h(y(t-k_2h)-y(t-(k_1+k_2)h))-k_1k_2h^2y(t-(k_1+k_2)h))^T$$

where h is a fundamental sampling period; and
y is a measured channel gain.

5. The method according to claim 3, wherein the parameter independent part of the prediction $c(t)$ is defined as $$c(t) = y(t-k_2h) + \frac{k_2}{k_1}(y(t-k_2h) - y(t-(k_1+k_2)h))$$

where h is a fundamental sampling period; and
y is a measured channel gain.

6. The method according to claim 1, wherein the channel is defined in terms of a parameter vector, being a continuous time estimated parameter vector, as $$\theta = (a_1 a_2)^T$$

where $a_1$ $a_2$ are the continuous time parameters.

7. The method according to claim 1, further comprising, performing a channel estimation using the predicted channel gain.

8. The method according to claim 1, when the sampling rate being below a threshold rate, further comprising feeding channel samples into a multirate predictor performing the prediction.

9. The method according to claim 8, when the sampling rate being equal or above the threshold rate, further comprising, averaging the channel samples instead to obtain an averaged channel gain estimate.

10. The method according to claim 1, further comprising, calculating an average of the channel gain by filtering channel samples;

calculating a first magnitude of difference between received channel samples and the calculated average of the channel gain;

calculating a second magnitude of difference between the received channel samples and the predicted channel gain; and selecting the predicted channel gain or the calculated average of the channel gain which ever gives a minimum expected error based on the calculated first and second magnitudes.

11. A radio network node for enabling channel handling of a channel between a wireless device and the radio network node in a wireless communication network wherein the channel is defined in continuous time and a sampling rate of the channel is non-uniform; the radio network node being configured to:

predict a channel gain using a first sampling descriptor indicating a first momentary sampling frequency and a second sampling descriptor indicating a second momentary sampling frequency, wherein the first sampling descriptor operates on a different segment of continuous time than the second sampling descriptor, which predicted channel gain enables channel handling.

12. The radio network node according to claim 11, wherein the radio network node is further configured to predict the channel gain by obtaining the channel gain by a linear prediction, wherein the radio network node is configured to multiply a continuous time estimated parameter vector with a regression vector obtained using the first and second sampling descriptors reflecting varying sampling periods.

13. The radio network node according to claim 11, further being configured to predict channel gain at time t, $\hat{y}(t)$, from $$\hat{y}(t) \varphi^T(t) \hat{\theta}(t-k_2 h) + c(t)$$

where $\varphi(t)$ is a regression vector at time t $\hat{\theta}(t-k_2 h)$ is a channel estimate at a time taking the second sampling descriptor into account; and c(t) is a parameter independent part of the prediction.

14. The radio network node according to claim 13, wherein the regression vector $\varphi(t)$ is defined as $$\varphi(t) = (-k_2 h(y(t-k_2 h) - y(t-(k_1+k_2)h)) - k_1 k_2 h^2 y(t-(k_1+k_2)h))^T$$

where h is a fundamental sampling period; and
y is a measured channel gain.

15. The radio network node according to claim 13, wherein the parameter independent part of the prediction c(t) is defined as $$c(t) = y(t - k_2 h) + \frac{k_2}{k_1}(y(t - k_2 h) - y(t - (k_1 + k_2)h))$$

where h is a fundamental sampling period; and
y is a measured channel gain.

16. The radio network node according to claim 11, wherein the channel is defined in terms of a parameter vector, being a continuous time estimated parameter vector, as $$\theta = (a_1 a_2)^T$$

where $a_1$ $a_2$ are the continuous time parameters.

17. The radio network node according to claim 11, further being configured to:

perform a channel estimation using the predicted channel gain.

18. The radio network node according to claim 11, further being configured to, when the sampling rate being below a threshold rate, feed channel samples into a multirate predictor performing the prediction.

19. The radio network node according to claim 18, further being configured to, when the sampling rate being equal or above the threshold rate, average the channel samples instead to obtain an averaged channel gain estimate.

20. The radio network node according to claim 11, further being configured to;

calculate an average of the channel gain by filtering channel samples;

calculate a first magnitude of difference between received channel samples and the calculated average of the channel gain;

calculate a second magnitude of difference between the received channel samples and the predicted channel gain; and select the predicted channel gain or the calculated average of the channel gain which ever gives a minimum expected error based on the calculated first and second magnitudes.

* * * * *